Feb. 28, 1956    A. SILVERMAN ET AL    2,736,141
METHOD OF PRODUCING GLASS FILAMENTS
Filed May 9, 1952    3 Sheets-Sheet 2

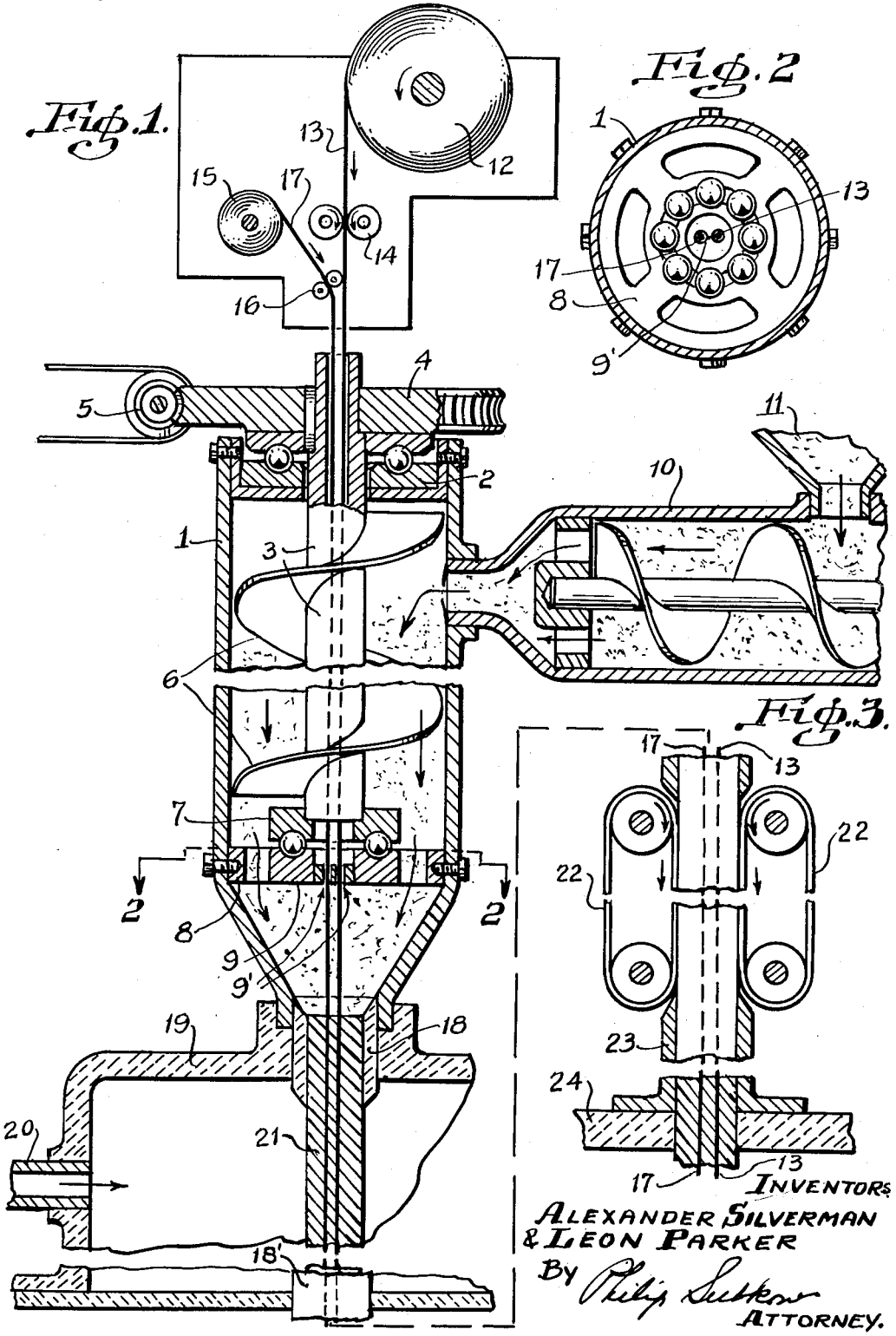

INVENTOR.
ALEXANDER SILVERMAN
& LEON PARKER
By Philip Subkow
ATTORNEY.

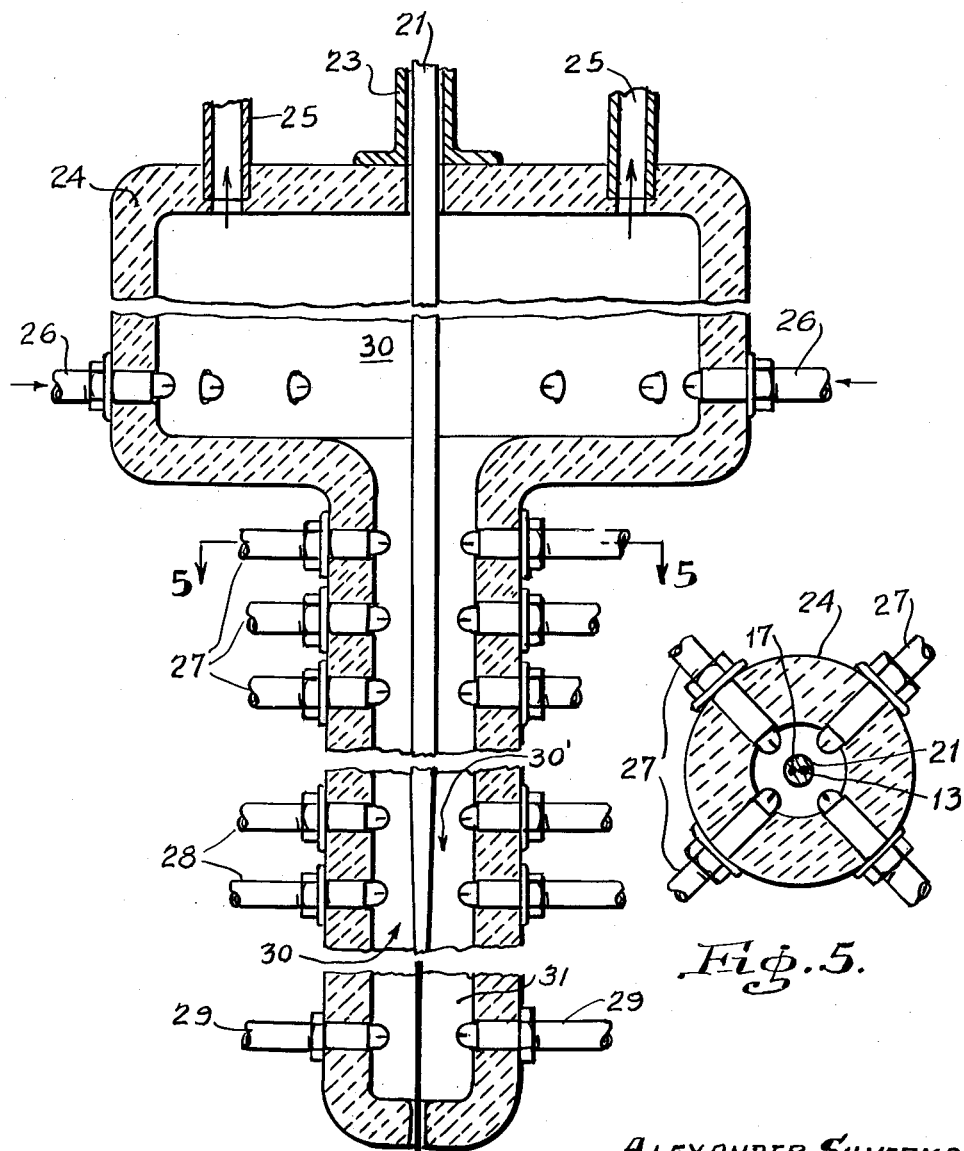

United States Patent Office 2,736,141
Patented Feb. 28, 1956

2,736,141
METHOD OF PRODUCING GLASS FILAMENTS

Alexander Silverman, Pittsburgh, Pa., and Leon Parker, Burbank, Calif., assignors, by mesne assignments, to said Silverman Application May 9, 1952, Serial No. 286,996

12 Claims. (Cl. 49—77)

In co-pending applications, Serial No. 268,871 and Serial No. 268,985, Alexander Silverman has disclosed methods for the formation of shaped glass articles, as, for example, filaments of glass, by extruding the desired shapes, made up of glass-forming materials in finely divided form, including, if desired, finely divided metal, bound together by a binder, and subjecting the shaped articles to high temperatures sufficient to fuse the glass and then solidifying the shaped form into a glass structure. When finely divided metals are included in the mix, the metal in the mass may be subjected to oxidizing conditions to convert the metal to the oxide state and incorporation of the oxide in the glass.

This application constitutes an improvement upon the methods disclosed in the above applications. In the procedures wherein the shaped mass of glass-forming powders, bonded together by bonding agents, is subjected to high temperature, the mechanical stability of the shaped structure may be impaired by the effect of the high temperatures upon the bond between the particles.

It is an object of our invention to improve the mechanical stability of the structure after formation and prior to the subjection thereof to fusion.

In this invention, we employ reinforcing wires to increase the mechanical strength of the shaped mass, to help the maintenance of the mechanical integrity of the shaped mass, in passing to the fusion zone.

By employing wires or rods which are readily oxidized, we may obtain the added advantage that the heat of oxidation of the wires provides a locus of high temperature inside the fusion zone and aids in the obtainment, within the body of the mass, of the temperatures necessary for fusion to produce the desired glass shape. We also obtain the added advantage that the wires originally present as such in the shaped mass are not included in the shaped glass. This is a particular advantage where, as described below, we employ our invention in the formation of glass filaments or rods.

The composition of the shaped structure and the wires will depend upon the nature of the glass which it is desired to form and upon the composition of the wire and upon the relative weight of the wire and the complementary glass-forming material used with the wires.

The complementary glass-forming material is finely divided and mixed with a binder and formed into a rod shape. The wire is incorporated into the shaped mass so as to form a reinforcing rod within the center of the extruded shape. Thus, for example, if the shape is of rod formation, the wire or rod is fed into the center of the shaped rod and acts to reinforce the extruded rod. The rod is then dried and cured and then passed to a fusion stage. Fusion may be caused by heat supplied by burners or other heat sources or may result from oxidation of the metallic rod.

If, as we prefer, the metallic wire be of a metal whose oxide is useful in forming the glass, the higher the heat of formation of the oxide the less heat will be necessary to supply from extraneous heat sources, and in such cases if the ratio of the metal weight to the other portions of the glass melt be sufficiently high, it may be possible to avoid extraneous heating entirely.

Instead of using wire of one metal, we may use either alloys of such metal or a plurality of wires of metals or their alloys, particularly if all of the metals or all of the components of the alloys are suitable for inclusion in the glass melt.

The shaped mass at the locus of the oxidation reaction, in the presence of the complementary oxides or other glass-forming materials employed in the shaped mass, produces, on oxidation of the metal, an oxidized product constituting a mixture or compounds composed of the mixture of the oxide of the metal or metals used in the metallic wire and the complementary oxides or other glass-forming compound present in the shaped mass. The oxidation may be caused by ambient oxygen in a surrounding oxygen containing atmosphere or from oxygen donors present in the shaped mass. However, if desired to produce some additional property, such as color, by inclusion in the glass of an element in its elementary and unoxidized state, we may oxidize the wire with one of the complementary oxides present in the shaped mass, limiting the oxygen entering into the oxidation reaction by limitation of the partial pressure of oxygen in the ambient gaseous atmosphere, if this be employed, or the amount of the oxygen available from oxygen donors to produce or leave some unoxidized element in the glass.

As stated above the oxygen for oxidation of the metal may be provided by oxygen containing gas in an ambient gaseous environment, controlling the partial pressure of the oxygen to give the desired reaction by adjustment of the pressure of the gas and the percentage of non-gaseous diluents employed, or by incorporation into the shaped articles particles of comminuted oxygen-yielding compounds which may act as donors of oxygen to oxidize the metal.

While our invention is applicable to various shapes which may be formed by molding, die forming or extrusion, it may be illustrated as advantageous by its application to the formation of filaments which is believed to be a very useful and desirable application of our invention.

The invention will be further described in connection with the drawings, in which Fig. 1 is a section of the upper portion of our form of apparatus, illustrating in somewhat schematic form our process of this invention;

Fig. 2 is a section taken on line 2—2 of Fig. 1;

Fig. 3 is a continuation of Fig. 1;

Fig. 4 is a continuation of Fig. 3;

Fig. 5 is a section taken on line 5—5 of Fig. 4;

Figure 7:
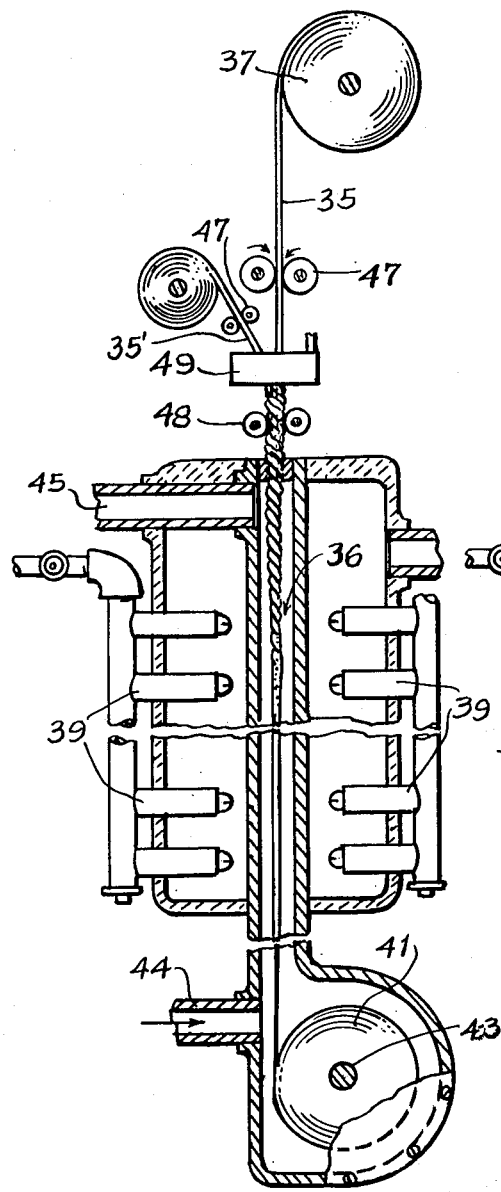
Fig. 7 is a vertical section of another form of apparatus, in somewhat schematic form, illustrating the process of our invention.

In Figs. 1 to 4, inclusive, the extruder 1 carries an end bearing 2 in which the hollow shaft 3 is rotatably mounted and driven by worm gear 4 and worm 5. The shaft bears a screw 6 as is conventional for extruders. The shaft is positioned in a hollow step thrust bearing 7 carried in the hollow spider 8. The spider 8 is closed by a centrally positioned plate 9 carrying bores 9'. The extruder 1, fed by way of the funnel 10, feeds the extruder 1. The screw 6 forces the mixture by the spider 8 and through the extrusion guide tube in which it is compacted and formed.

The wires 13 and 17 are each fed off reels 12 and 15, respectively, and pushed forward by the gripping wheels 14 and 16 and fed through the hollow shaft 3. They pass in a sliding fit through the bores 9' in plate 9 which, but for the bores 9′, closes the end of the hollow shaft. The wires are thus fed into the interior of the forming extrusion nozzle 18 and are positioned inside the rod and reinforce the rod. It will be understood that we may employ one, two, or more wires and the plate 9 may be bored with holes equal in number to the number of wires employed.

As indicated below, we may use ribbons in place of wires and may use rods of any cross section and alter the shape and number of holes in the plate 9 so that when the wire, rod or ribbon passes through the hole it fits the bore so as to substantially prevent any backward feed of the material in the extruder 1 through the hollow bore in shaft 3.

The extruded rod 21 passes through the heater 19 wherein it is heated by hot gases entering via 20 and the rod is cased therein. In this furnace the rod is dried out, degassed and baked or cured (if a binder is used) into a mechanically strong structure reinforced by the wires. If incipient fluxes are employed as described hereinbelow, these may also be fused and the particles thereby burned in this region, if desired. The rod is guided by guide rod 18′ out of the heater 19 and pulled forward by the gripping belt 22 which travels as indicated by the arrow to guide and move the rod 21 into the guide tube 23 positioned on top of the furnace 24, heated by burner 26, gases escaping via 25. The belt pulls the rod 21 downward and thus also, acting with the gripping rollers 16 and 14, assists in advancing the wires.

In this furnace the rod is raised to the fusion stage either by the aid of heat from the burners 27 and 28 or from the exothermic heat of oxidation of metals in the wires and, if desired, by the oxidation of the finely divided metals incorporated in the rod 21, aided, if desired, by externally applied heat from the burners.

In this fusion stage the wires and metals are oxidized and the glass is fused. The oxidation is thus carried out at the temperature of fusion and any possible excessive heat loss which would drop the temperature below the temperature of fusion, if such could occur, may be avoided by heating the rod by means of the burners 27 and 28.

Oxygen, if such be used, may be supplied by nozzles 29 or may be introduced via nozzles 27 and 28 either alone or together with combustion gases in the form of an oxidizing flame, i. e., with oxygen mixed with combustion gases in amounts more than sufficient to completely burn the combustion gases. The burner 27 when used preheats the rod and the burners 27 and 28 are employed to obtain or maintain the desired fusion temperature and viscosity control.

Should the heat of oxidation be sufficient to melt the glass and to raise the temperature to a point where the glass is too fluid, cooling may be effected to control the temperature by introducing relatively cool gas via 28 or 29 as desired.

The resultant fusion temperature in the zone 30 where attenuation occurs may thus be controlled by controlling the partial pressure of the oxygen in the ambient atmosphere and the degree of heating or cooling obtained. The rod in zone 30 is thus at a temperature sufficient to obtain a molten glass of viscosity sufficient to attenuate the fiber.

By employing the burners 27 and 28, the oxidation reaction zone may be maintained at the desired elevated temperature to act as constant temperature baths to prevent excessive loss of heat from the rods. The heat input required by the burners would thus be that necessary to compensate for heat losses from the thread which otherwise would occur. This is particularly important when, as in a rod of small diameter or in a thread, the ratio of the surface to volume or mass is so very high.

We may supply the oxygen not provided for by the oxygen donor by passing the shaped glass-forming material through an environment containing ambient free oxygen gas. The oxygen available will be sufficient to oxidize the elements present to their oxide form unless, by special adjustment of oxygen donor concentration and ambient oxygen, it is desired to have some of the material in elementary form in the glass, in which case incomplete oxidation is effected instead, as in the cases illustrated herein by examples, of all of the elements being in oxide form, a form which we term completely oxidized, using this term to means that all elements are in oxide form without reference to their valence state in the oxide. The heat of reaction may be sufficient to ignite the metal to convert the same to the oxide generating the heat inside the rod if the heats of formation are favorably high, thus avoiding the difficulty of transference of heat from the exterior into the interior of the rod to melt the same when employing externally applied heat.

The heat generated by the oxidation process will be uniformly generated throughout the body of the rod, particularly so if the oxidation process proceeds from an oxygen donor, so that the mass is rapidly and uniformly raised to the fusion point of the desired glass. The various oxides of the extruded rod and those formed by oxidation of the wire melt together to give a homogeneous melt. Thus phase segregation of lower melting glasses from higher phase melting unliquefied components is avoided.

The glass-forming components and the reacting materials are intimately mixed with a binder. The binder may be any binder suitable for the purpose.

Thus, we may use dilute water solutions, such as sodium silicate and potassium silicate solutions, if the silicates are not undesirable in the mass when used in the proportions necessary to wet the particles. Depending upon the glass composition and its tolerance of the binder component, we may use clay, Portland cement and other cements as a binder, adjusting the water content to give a good cohesive and extrusive mass. Thus, we may use water or an organic binder, or the plastic adhesive binders of either the thermoplastic or thermosetting types. Such plastic compositions are well known in the art. For example, the phenolic resins, either self-hardening or heat-hardening type, the urea-formaldehyde type, or polyvinyl chlorides and chlorinated rubber and other types of adhesive products may be used, as, for example, the silicone resins. The binder, preferably, should be such as will permit the shaping of the articles from particles of the glass-forming materials and either be evaporated, burned off, or otherwise eliminated, or, if not so eliminated, be suitable for inclusion in the glass mass.

Many of these binders are unstable and will be dehydrated, if dependent upon moisture, or burned, if organic, or otherwise destroyed, or will lose their binding properties at temperatures at or below the fusion temperatures of the glass to be formed. In such case I also incorporate, in addition to the low temperature binders illustrated above, comminuted, e. g. powdered, solid incipient fluxes which on fusion or reaction with the surfaces of the particles of the glass-forming materials, make a surface bond between the particles of the glass-forming materials in the shaped article.

We employ these incipient fluxes in such quantities as will cause such surface bonding to occur either by fusion or by sintering of the glass-forming particles. We employ the incipient fluxes in finely divided form and prepare a uniform and intimate mix thereof with the glass-forming materials and with the finely divided elements. If we do not desire to alter the melting point of the glass obtainable from the glass-forming materials employed with the incipient fluxes, we use these incipient fluxes also in as low an amount as possible in order to avoid undesirable modification of the composition and melting point of the resultant glass. These materials will melt at such a temperature that they will supplement the low temperature binders. The particles of the shaped mass are bonded together throughout their travel to the fusion stage. Examples of such incipient fluxes are sodium carbonate, potassium carbonate, lithium carbonate, sodium nitrate, potassium nitrate, lithium nitrate, fused mixtures of the nitrates, as, for example, mixtures of sodium and potassium nitrate, sodium and potassium phosphate, and equimolar mixtures of potassium and lithium fluoride. These incipient fluxes, all having a melting point below about 1000° (i. e., about 1800° F. and as low as about 447° F.), will melt below the temperature of the melting point of the glass and some of them will melt at temperatures close to the decomposition point of the low temperature bonding agent. Thus lithium nitrate melts at 251.4° C. and $NaNO_3$ 30%.$KNO_3$, 70% at 230.5° C. These incipient fluxes will react with the glass-forming materials in the mixture and on doing so will cement together the higher melting particles of the glass-forming materials. The reaction product at the surface will in most cases have a higher melting point than the incipient fluxes.

In the case of the following examples, the reaction is started by igniting the end of the rod as it passes into the reaction zone and the heat of reaction continues, aided by the addition of oxygen, to convert the metal into an oxide. The wire is thus consumed to form the oxide. The heat generated is sufficient to melt the glass at the end of the rod which is being continuously extruded. The molten glass descends in a thin filament and may be wound or blown and batted as described herein.

The gravity attenuation of the vertically disposed thread may be aided by the winding tension of the reel 41. The fiber after it is attenuated to the desired diameter in zone 30 passes into zone 31 where it is chilled by the relatively cool oxygen containing gas entering via 29 and by atmospheric air in the zone 32 outside the furnace to chill the molten glass rapidly to solidify the glass and cool the glass to below the tack point of the glass so that when the glass is reeled onto reel 34 it will not stick to other strands of the glass or to the reel.

*Example 1*

Thus, for example, we may employ magnesium wires 13 and 17 and employ as the complementary glass-forming compound powdered $Al_2O_3$ which is mixed with the binder in the mixer 10 and fed into the extruder 1. The magnesium wire is reeled from reels 12 and 15 and fed by feed rollers 14 and 16 through the hollow shaft 3 and through the extruder nozzle 18. The ignition of the magnesium wire in the zone 30 in the presence of ambient oxygen containing gas will cause the formation of MgO and its fusion with $Al_2O_3$ to form $MgO.Al_2O_3$. This material will melt at 2135° C. By proper control of the temperature in 30 by addition of heat via burners 28 or by cooling gases via 29 and 30, if the temperature at the molten end of the rod in zone 30 gets too high, the viscosity of the glass may be properly maintained so that the molten filament will attenuate to the desired dimension.

The temperature may also be controlled by adjusting the composition of the extruded rod 21 containing the wire.

Thus, in order to form $MgO.Al_2O_3$ using the Mg wire and $Al_2O_3$, we may use these materials in molar ratio, i. e., the wire is of such weight that per unit length of rod 21, the Mg and $Al_2O_3$ are present in the ratio of their formula weights, i. e., 24.3 parts of Mg to 101.9 parts of $Al_2O_3$. The temperature will be the higher the higher the ratio of the Mg to the complementary $Al_2O_3$. If the resultant temperature is too high, we may incorporate powdered magnesium aluminate ($MgO.Al_2O_3$) to absorb in its melting part of the heat of the oxidation of MgO, or we may reduce the weight of the Mg wire used, replacing the Mg with an equivalent weight of MgO.

If as a result of extraneous heat losses or other causes the oxidation does not produce sufficient heat, we may replace part of the aluminum oxide with aluminum wire, feeding the magnesium and the aluminum wires in the manner described above. The aluminum wire, like the magnesium wire, is oxidized giving in the case of the aluminum wire $Al_2O_3$.

Heat losses may also be obviated by supplying sufficient heat by means of burners 27 and 28 to maintain the desired temperature in zone 30.

The molten thread of magnesium aluminate glass of the desired diameter passes into zones 32 and 31 where it is cooled rapidly to fix the glass state, and the solid thread is cooled below its tack point so that it will not stick to any other surface. It is wound on the reel 41 under winding tension which thus aids in the attenuation of the thread.

Instead of reeling the solid thread on a reel, the molten thread is blown by a nozzle of blast gases and formed into short solid glass staple fibers on a belt.

*Example 2*

Instead of $Al_2O_3$ as in Example 1, we may use $TiO_2$ in carrying out the process as described hereinafter, and if we use enough magnesium to give on oxidation 75% by weight MgO or more, we will obtain a glass melt of about 1800° C.

We may replace part of the $TiO_2$ with titanium wire and feed the titanium wire with the magnesium wire in the same manner as the aluminum wire. Powdered titanium metal may be incorporated in the place of part of the $TiO_2$. The titanium metal powder or wire is oxidized to $TiO_2$. In like manner we may replace part of the $TiO_2$ with a portion of powdered $MgO—TiO_2$ glass, for control of temperature as described herein.

*Example 3*

Instead of $Al_2O_3$ in Example 1, we may use $SiO_2$ and if we use enough Mg wire to give a melt containing up to about 40% of MgO, we will obtain a glass having a melting point in excess of about 1850–1900° C.

In addition to the $SiO_2$ we may use powdered Si in the powder mix, adjusting the proportions to obtain the desired ratio of MgO and $SiO_2$ in the melt. We may also supply part of the MgO required in the melt by means of powdered Mg added to the mixture in 10. The Si and the powdered Mg is oxidized along with the Mg wire.

*Example 4*

Instead of $Al_2O_3$ in Example 1, we may use NiO and we may use any suitable proportion of NiO and Mg and obtain a glass having a melting point above about 2500° C.

We may replace part of the NiO with either powdered Ni added in the mixer 10. We may also use Ni wire fed in addition to the Mg wire in the same manner as described above for Examples 1 to 3. Thus wire 13 may be Mg and wire 17 may be Ni. Part of the MgO may also be supplied by powdered Mg added to the mixer 10. The powdered Ni, Mg and the Ni wire if used are oxidized together with the oxidation of the Mg wire.

*Example 5*

We may use $ZrO_2$ in place of $Al_2O_3$ in Example 1 and the glass thus formed will have a melting point above about 2000° C., which is the melting point of magnesium-zirconate glass containing equimolar amounts of MgO and $ZrO_2$. Part of the MgO or $ZrO_2$ in the glass may be supplied by powdered MgO or powdered Mg and part of the $ZrO_2$ or powdered Zr added to the original mix by powdered $ZrO_2$ and part of the Zr may be supplied in the form of Zr wire fed as in the case of the Al wire, as is described in Example 1.

*Example 6*

We may use $Cr_2O_3$ to give a glass having a composite of $MgO.Cr_2O_3$ using the Mg and $CrO_3$ in such proportions as to give the equimolar ratio of MgO to Cr₂O₃. As previously stated in Example 1 in connection with the glasses there described, we may replace a portion of Mg wire by powdered Mg and we may form part of the chromium oxide required in the glass mixture by means of powdered chromium metal fed to the mixer. The metals are oxidized to the corresponding oxide and the glass is formed from the fusion of these oxides.

Instead of Mg, we may use wires of other metals, where these metals on oxidation give sufficient heat to raise the temperature of the glass melt to the fusion temperatures of the melt. In such case, where the ignition of the wire may be assisted by heat, we may add heat to the system via the burners 27 and 28. We may also supply the oxygen from oxygen donors or by ambient oxygen. Thus we may use in place of Mg aluminum wire together with the complementary oxides as set forth by way of illustration in Examples 1 to 6, inclusive.

*Example 7*

Aluminum wire is fed from reels on 15 and 12 and calcium peroxide mixed with suitable binder is mixed in the mixer 10 and fed into the extruder 1. By proper regulation of the ratio of weights of Al and CaO₂ fed into the nozzle 18 a glass is formed at the end of the rod at zone 30 having an equimolar ratio of Al₂O₃ and CaO. This material will have a melting point of 2500° C.

Instead of CaO₂ we may use CaO and provide the necessary oxygen from the ambient oxygen containing atmosphere by means of oxygen containing gas fed through 29 or 28 as described above.

By adjusting the ratio of the weight of Al wire fed per unit of time through the nozzle 18 to the weight of the oxide fed through the same nozzle, we may obtain any desired ratio of Al₂O₃ to CaO, in the glass, to give the melting point desired. For example, we may obtain glasses having melting points of about 1400–1500° C. for glasses approximating in composition 5CaO.3Al₂O₃, and the glass of composition CaO.Al₂O₃ will have a melting point of 1600° C. and one of composition 3CaO.5Al₂O₃ a melting point of about 1700° C.

*Example 8*

Instead of CaO₂ or CaO in Example 7, we may use BaO₂ or BaO. Thus a glass of composition BaO.Al₂O₃ will have a melting point of 1860° C.

*Example 9*

We may also form glasses of the system BeO—MgO—Al₂O₃ of which the glass of composition 25% BeO, 13% MgO and 62% Al₂O₃ has a melting point of about 1750° C.

We may obtain this by passing Mg wire and mixture of powdered BeO and Al₂O₃ or aluminum or beryllium wire, in equivalent proportions to the percentages given above, through the extruder. Also we may use aluminum wire and powdered magnesium, magnesium aluminate, magnesium oxide or beryllium or beryllium oxide, choosing from these materials an amount to give the desired ratio of the metals and oxides for the desired composition on oxidation of metals and feeding the wires and the powdered materials through the extruder at the desired rates to obtain the desired composition.

*Example 10*

A glass of the system BeO—Al₂O₃ may be obtained by employing Al wire and BeO powder in the manner described above. By proper proportioning of the ratio weight of the aluminum wire to the BeO oxide used we may form a glass having a composition BeO—Al₂O₃ having a melting point of 1890° C.

*Example 11*

In place of BeO as in Example 10, we may employ SiO₂ and proportion the weights of SiO₂ and aluminum wire. For example, we may use them in proportions to yield on oxidation of the aluminum wire a glass of composition 56% Al₂O₃ by weight and 44% SiO₂ by weight to give a melting point of 1810° C. and by reducing the ratio of SiO₂ to Al₂O₃ by reducing the ratio of SiO₂ to aluminum wire we may obtain glasses of higher melting point.

*Example 12*

In place of BeO as in Example 11, we may use TiO₂. The resultant glass will have a melting point depending upon the ratio of Al₂O₃ formed on oxidation of the aluminum wire to TiO₂ used. For example, a glass containing 20% by weight of Al₂O₃ has a melting point of 1715° C. and one containing 65% by weight of Al₂O₃ has a melting point of 1850° C. By proportioning the weight of Al wire to the TiO₂ we may obtain the desired glass composition on oxidation of the aluminum wire.

*Example 13*

In place of TiO₂ as in Example 12, we may use NiO and proportion the weight of NiO to the Al wire employed. Thus we may obtain on oxidation of the aluminum a glass having a composition NiO.Al₂O₃ having a melting point of 2030° C. by employing a formula weight of NiO to two formula weights of Al wire.

*Example 14*

We may use Cr₂O₃ with aluminum wire and obtain glasses on oxidation of the aluminum whose melting points will be the higher the less the ratio of Al to the Cr₂O₃ i. e. between 2045° C. and 2275° C. For example, using the ratio of 1.5 formula weights of aluminum wire or more to 7 formula weights of Cr₂O₃, on oxidation of the aluminum the glass will have a melting point in the region of 2100° to 2200° C.

*Example 15*

(a) As in the case of the substitution of part of the Al₂O₃ used in Example 2 by equivalent amount of aluminum wire, we may replace part of the complementary oxides used together with the metallic wire in the previous examples by wire of the metal element of such complementary oxides; for example, we may in Example 2 replace a part or all of the TiO₂ with a titanium metal wire fed together with Mg.

(b) In like manner the metallic element of the complementary oxide specified in Examples 4 to 6, both inclusive, to wit, Ni, Zr, and Cr, may be fed along with the Mg wire employed in said examples, replacing a part or all of the NiO, ZrO and Cr₂O₃ in the powder, as the case may be, with the corresponding metal. We proportion the weight relationships of the metallic elements and the oxides to give the desired composition in the same manner as is specified in Examples 4 to 6, inclusive.

(c) In like manner, in place of the complementary oxides employed in Examples 7 to 14, inclusive, we may use the corresponding elements Ca, Ba, Mg, Be, Si, Ti, and Cr, replacing all or part of the corresponding oxide by a ribbon, sheet or rod of the element whose oxide is replaced.

Thus, for example, we may use the solid elements group IIA (referring to the periodic arrangement of the elements given in Fundamental Chemistry (2nd ed.) by H. G. Denning) which includes Be, Mg, Ca, Sr, and Ba; group IIB including the solid elements Zn and Cd; group IIIA including B, Al; and group IIIB in the lanthanide transition series Ce (either alone or as misch metal) and in the actinide series Th, and U; and of group IVA, the elements Si and Ge; and of group IVB, Ti and Zr; and in group VB the element V; group VIB, the elements Cr, Mo and W; group VIIB, Mn and the transition series of the third period in group VIII, to wit, Fe, Co and Ni.

All of these metals and metalloids are solid and may be formed into ribbon, wire or rod form, all of which are termed herein as a wire form, and on oxidation will give oxides which are desirable for incorporation into glass and will give high heats of oxidation which because of the exothermic nature will aid in the fusion of the glass.

Instead of the pure metal or metalloid we may employ alloys of these metals. We may employ the alloys of two or more of any of the following metals: B, Be, Mg, Ca, Ba, Al, Zn, Cd, Si, Zr, Cr, and Th.

All of the above elements are useful for the production on oxidation of glass formers and glass modifiers and the element may be formed into a long shape in the form of ribbon, rod, or wire. Wherever we use the term wire in this specification, it is to be understood to include rods or strips in elongated shape which will act in a manner equivalent to the wire. By the term wire of an element whose oxide is a glass former, we mean to include all elements such as are listed herein, whether in wire, rod or ribbon form and whether the oxide enters as a mass constitutent of the glass or is present in lesser amount to modify a glass.

We may also replace part of the oxides employed in these examples with metallic powder incorporating the metallic powder with the oxide powders which are extruded with the wire by proportioning these metallic and oxide powders and the wire so that the metal on oxidation and fusion with the oxides or other glass-forming compounds will form the glass composition desired.

All of the above elements, alloys, and compounds of these elements as described above may generically be identified as elements whose oxides are glass-forming, alone or on reaction with other glass-forming materials, understanding "an element whose oxide is a glass-forming oxide" to include the oxides of each of the above listed elements whether used separately or as an alloy or as a compound which on oxidation produces an oxide or plurality of oxides where more than one element is concerned, whether the oxide enters directly into the formation of a glass or is incorporated as a modifier of glasses formed primarily of the oxides of other elements.

In addition to the oxides, for example, the oxides complementary to those generated from the metal necessary for the formation of the glass, as illustrated in the previous examples, other oxides or carbonates useful for production of glasses, depending upon the melting point and composition desired, may be used. Such materials may also act as incipient fluxes as described above. Thus, we may use those materials ordinarily employed in glass mixes and which we term, together with the materials referred to in the examples, glass-forming materials, including in the term "glass-forming materials" those materials which act as glass modifiers. Examples of these materials are, in addition to the oxides referred to above, FeO, $Na_2O$, $Na_2CO_3$, $K_2O$, $K_2CO_3$, $B_2O_3$ as borates of boracic acid and $P_2O_5$ as phosphates, $GeO_2$, $V_2O_5$. Instead of or in addition to the oxides we may use the fluorides and we may generate these fluorides from the metals of such fluorides by replacing the ambient oxygen with fluorine in the process described above to convert the metals into the corresponding fluorides.

Instead of the oxygen donors referred to in the above examples, especially where the component referred to is desirable for incorporation in the melt, we may employ as oxygen donors the so-called per salts, i. e., the percarbonates or perborates, and in some cases where the oxide exists in more than one state of valency, we incorporate the oxide in its higher state of valency and it will be reduced by the powdered metal to the lower state of valency in which state it is desired that it be incorporated into the glass.

In the above examples we have indicated that in place of the complementary glass-forming oxides employed together with the ribbon, wire or rod form of the metal we may employ another ribbon, wire or rod formed of the metal element of such first mentioned complementary oxide. We may, however, where the nature of the metals permits, omit the oxides and rely upon the oxidation of the metallic wires to produce the oxides of the glass. Thus, a wire or a plurality of the same or of different wires may be fed into the oxidation zone adjacent to each other, as, for example, mechanically intertwined or otherwise united. In place of the separate wires we may feed the alloy of such metals in such wire, rod or ribbon form.

In such case we may avoid the use of the extruder and the extrusion of a rod of bonded powders and so avoid the problems incident to the maintenance of structure in passing from the curing to the fusion stage. The metal wires, rods or ribbons are fed directly into the oxidation zone where the rods are ignited in the ambient oxygen and the glass formed as a molten stream of viscosity necessary to obtain attenuation in the manner described above.

Figure 6:
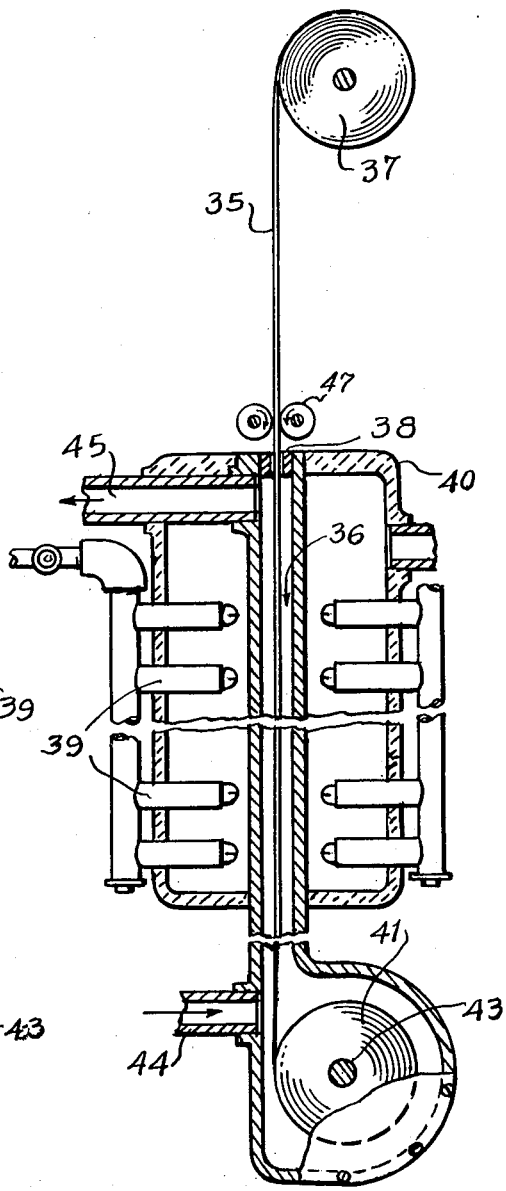
Fig. 6 is a vertical section of another form of apparatus, in somewhat schematic form, illustrating the process of our invention.

Figs. 6 and 7 illustrate a form of apparatus in which the process is carried out.

In Fig. 6, the wire, rod or ribbon 35 may be fed to the reaction zone 36, as, for example, in the case of a wire or ribbon from a reel 37 fed by gripping rollers 47 which, acting like the rollers 14 in Fig. 1, on rotation in the direction of the arrows, advance the wire. The wire may be a single rod, wire or ribbon of a metal or an alloy of more than one metal. It passes into the reaction zone through a closely fitting bushing 38 in the top of the reaction zone 36. The reaction zone which may be made of suitable heat resistant material, as in the case of a furnace muffle, may be heated by burners 39 in the furnace 40.

The reaction chamber connects to a reel chamber 41 in which a reel is positioned for rotation on shaft 43. Suitable removable cover held by suitable bolts may be provided on the ends of the chamber for access to the reel chamber.

A gas inlet is provided at 44 and a gas outlet at 45.

In Fig. 7 the structure of Fig. 6 is used to feed a plurality of twisted wires into the reaction chamber. In Fig. 7, the parts which are similar to those of Fig. 6 bear the same number.

In Fig. 7 the separate wires 35 and 35' are fed from different reels and fed into the furnace by the gripping rolls 47 and 48. The wires are twisted by a conventional wire twisting mechanism of conventional design, of which several are well known to the art, and the twisted wires pass through a snugly fitting port in the reaction zone.

Thus I may pass, in the apparatus of Fig. 6, Mg wire or Al wires or the metals Sr, Ca, Ba, Be, Si, Ti, Cr, Zn, Cd, B, Ge, Zr, V, Mo, W, Fe, Co, Ni, or an alloy of any two or more metals as, for example, an alloy of any two or more of the following metals B, Be, Mg, Ca, Ba, Al, Zn, Cd, Si, Zr, Cr, Th. These metal or alloy rods, wires, or strips are fed into the reaction zone which may be heated by the flames from burners 39. Oxygen or air or oxygen enriched air may be introduced via 44 and a suitable gas pressure maintained in the reaction zone.

The wire is burned to the corresponding oxide or oxides and raised by the exothermic heat of reaction, aided, if necessary, by the burners 39, to a fusion temperature and, depending on the viscosity of the melt, to a somewhat higher temperature at which a thread of the resulting glass is formed. If the rod or wire is of a relatively large diameter and it is desired to make a rod or filament of smaller diameter, the temperature is adjusted to give a viscosity of a coherent thread which will flow by gravity and attenuate, aided, if desired, by the winding tension of the reel. The wire is continually advanced and the formed filament reeled in a continuous thread on the reel.

In some cases, where the heat losses are not excessive, the heat of reaction due to oxidation because of the high heat of formation of the oxide, gives an autogenous reaction temperature in zone 36 which is too high. In such case cooling gases may be introduced via 39, or, if desired, in addition or in place thereof, the oxygen gases entering through 44 may be cooled to abstract sufficient heat from the locus of reaction to control the temperature to that which will give the viscosity sufficient to form the thread or rod as described above.

While we have described our invention in connection with the form we now prefer as one of the most useful applications of our invention, we do not desire to be limited to the disclosed form. Other forms of apparatus may be employed to carry out the process as described herein. Other shapes than threads or filaments may be produced depending upon the shape of the extruding nozzle employed in the process illustrated by Figs. 1 to 5, inclusive. Shapes need not be extruded, but may be molded, die formed or shaped in other ways and subjected to the flame impingement and the heat necessary to yield glass formation in a manner equivalent to that described above in connection with the production of filaments. Thus we may extrude or otherwise shape the bonded mass of glass forming materials into a tube, plate, sheet, or ribbon, heat the mass to incipient fusion of the fluxes, where such are used, without alteration of the form of the article, and raise the temperature rapidly to the fusion point of the glass to produce a coherent viscous mass without substantial alteration of shape and chill the shaped and fused mass to solidify the extruded shape; for example, the extruded tube, plate, sheet, or ribbon of glass.

The various glass compositions, fluxes, and flames have been all given for illustration of our invention.

While we have described a particular embodiment of our invention for the purpose of illustration, it should be understood that various modifications and adaptations thereof may be made within the spirit of the invention as set forth in the appended claims.

We claim:

1. A method of forming glass filaments, which comprises forming an elongated rod of bonded powdered glass-forming material, said rod containing reinforcing wires of elements whose oxide is a glass-forming oxide, complementary to the said glass-forming material, oxidizing the said reinforcing wires to convert said elements to the oxide of said elements, raising the temperature of the said rod sufficiently to fuse the glass-forming material and said oxide, forming a molten glass filament of said glass-forming material and said oxide, attenuating said molten filament, and chilling said filament to form solid glass filaments.

2. A method of forming glass filaments, which comprises forming an elongated rod of bonded powdered glass-forming material, said rod containing reinforcing wires of elements whose oxide is a glass-forming oxide, complementary to the said glass-forming material, passing said rod through ambient oxygen-containing gas, oxidizing the said reinforcing wires to convert said elements to the oxide of said elements, raising the temperature of the said rod sufficiently to fuse said glass-forming material and said oxide, forming a molten glass filament of said glass-forming material and said oxide, attenuating said molten filament, and chilling said filament to form a solid glass filament.

3. A method of forming glass filaments, which comprises forming an elongated rod of bonded powdered glass-forming material and an oxygen donor powder, said rod containing reinforcing wires of elements whose oxide is a glass-forming oxide, complementary to the said glass-forming material, passing said rod through ambient oxygen-containing gas, oxidizing the said reinforcing wires to convert said elements to the oxide of said elements, raising the temperature of the said rod sufficiently to fuse the mixture in said rod, forming a molten glass filament, attenuating said molten filament, and chilling said filament to form a solid glass filament.

4. A method of forming glass filaments, which comprises forming an elongated rod of bonded powdered glass-forming material and an oxygen donor powder, said rod containing reinforcing wires of elements whose oxide is a glass-forming oxide, complementary to the said glass-forming material, oxidizing the said reinforcing wires to convert said elements to the oxide of said elements, raising the temperature of the said rod sufficiently to fuse the mixture in said rod, forming a molten glass filament, attenuating said molten filament, and chilling said filament to form a solid glass filament.

5. A method of forming glass filaments, which comprises mixing comminuted glass-forming powder with a binder, shaping said mixture about wire of an element whose oxide is a glass-forming oxide, to form a rod reinforced by said wire, oxidizing the said reinforcing wire to convert said element to the oxide of said element, raising the temperature of the said rod sufficiently to fuse said glass-forming material and said oxide, forming a molten glass filament of said glass-forming material and said oxide, attenuating said molten filament, and chilling said filament to form a solid glass filament.

6. A method of forming glass filaments, which comprises mixing comminuted glass-forming powder with a binder, shaping said mixture about wire of an element whose oxide is a glass-forming oxide, to form a rod reinforced by said wire, passing said rod through ambient oxygen-containing gas, oxidizing the said reinforcing wire to convert said element to the oxide of said element, raising the temperature of the said rod sufficiently to fuse said glass-forming material and said oxide, forming a molten glass filament of said glass-forming material and said oxide, attenuating said molten filament, and chilling said filament to form a solid glass filament.

7. A method of forming glass filaments, which comprises mixing comminuted glass-forming powder with a binder and an oxygen donor powder, shaping said mixture about wire of an element whose oxide is a glass-forming oxide, to form a rod reinforced by said wire, passing said rod through ambient oxygen-containing gas, oxidizing the said reinforcing wire to convert said element to the oxide of said element, raising the temperature of the said rod sufficiently to fuse the mixture in said rod, forming a molten glass filament of said glass-forming material and said oxide, attenuating said molten filament, and chilling said filament to form solid glass filament.

8. A method of forming glass filaments, which comprises mixing comminuted glass-forming powder with a binder and an oxygen donor powder, shaping said mixture about wire of an element whose oxide is a glass-forming oxide, to form a rod reinforced by said wire, oxidizing the said reinforcing wire to convert said element to the oxide of said element, raising the temperature of the said rod sufficiently to fuse the mixture in said rod, forming a molten glass filament of said glass-forming material and said oxide, attenuating said molten filament, and chilling said filament to form a solid glass filament.

9. A method of forming glass filaments, which comprises mixing comminuted glass-forming material and a binder, passing wire through a shaping nozzle, said wire being of an element whose oxide is glass-forming, extruding said mixture through said nozzle, forming a rod of said comminuted material reinforced by said wire, oxidizing the said reinforcing wire to convert said element to the oxide of said element, raising the temperature of the said rod sufficiently to fuse said glass-forming material and said oxide, forming a molten glass filament of said glass-forming material and said oxide, attenuating said molten filament, and chilling said filament to form a solid glass filament.

10. A method of forming glass filaments, which comprises mixing comminuted glass-forming material and a binder, passing wire through a shaping nozzle, said wire being of an element whose oxide is glass-forming, extruding said mixture through said nozzle, forming a rod of said comminuted material reinforced by said wire, passing said rod through ambient oxygen-containing gas, oxidizing the said reinforcing wire to convert said element to the oxide of said element, raising the temperature of the said rod sufficiently to fuse the mixture in said rod, forming a molten glass filament of said glass-forming material and said oxide, attenuating said molten filament, and chilling said filament to form a solid glass filament.

11. A method of forming glass filaments, which comprises mixing comminuted glass-forming material, a binder, and an oxygen donor powder, passing wire through a shaping nozzle, said wire being of an element whose oxide is glass-forming, extruding said mixture through said nozzle, forming a rod of said comminuted material reinforced by said wire, passing said rod through ambient oxygen-containing gas, oxidizing the said reinforcing wire to convert said element to the oxide of said element, raising the temperature of the said rod sufficiently to fuse the mixture in said rod, forming a molten glass filament of said glass-forming material and said oxide, attenuating said molten filament, and chilling said filament to form a solid glass filament.

12. A method of forming glass filaments, which comprises mixing comminuted glass-forming material, a binder, and an oxygen donor powder, passing wire through a shaping nozzle, said wire being of an element whose oxide is glass-forming, extruding said mixture through said nozzle, forming a rod of said comminuted material reinforced by said wire, oxidizing the said reinforcing wire to convert said element to the oxide of said element, raising the temperature of the said rod sufficiently to fuse the mixture in said rod, forming a molten glass filament of said glass-forming material and said oxide, attenuating said molten filament, and chilling said filament to form a solid glass filament.

References Cited in the file of this patent

UNITED STATES PATENTS

| | | |
|---|---|---|
| Re. 22,078 | Newman et al. | Apr. 21, 1942 |
| 1,793,529 | Taylor | Feb. 24, 1931 |
| 2,171,006 | Morgan et al. | Aug. 29, 1939 |
| 2,313,296 | Lamesch | Mar. 9, 1943 |
| 2,390,354 | Clapp | Dec. 4, 1945 |
| 2,566,252 | Tooley et al. | Aug. 28, 1951 |